Oct. 24, 1950 — C. A. COBB — 2,527,117
TEMPERATURE RESPONSIVE CONTROL
Filed Sept. 9, 1947 — 3 Sheets-Sheet 1
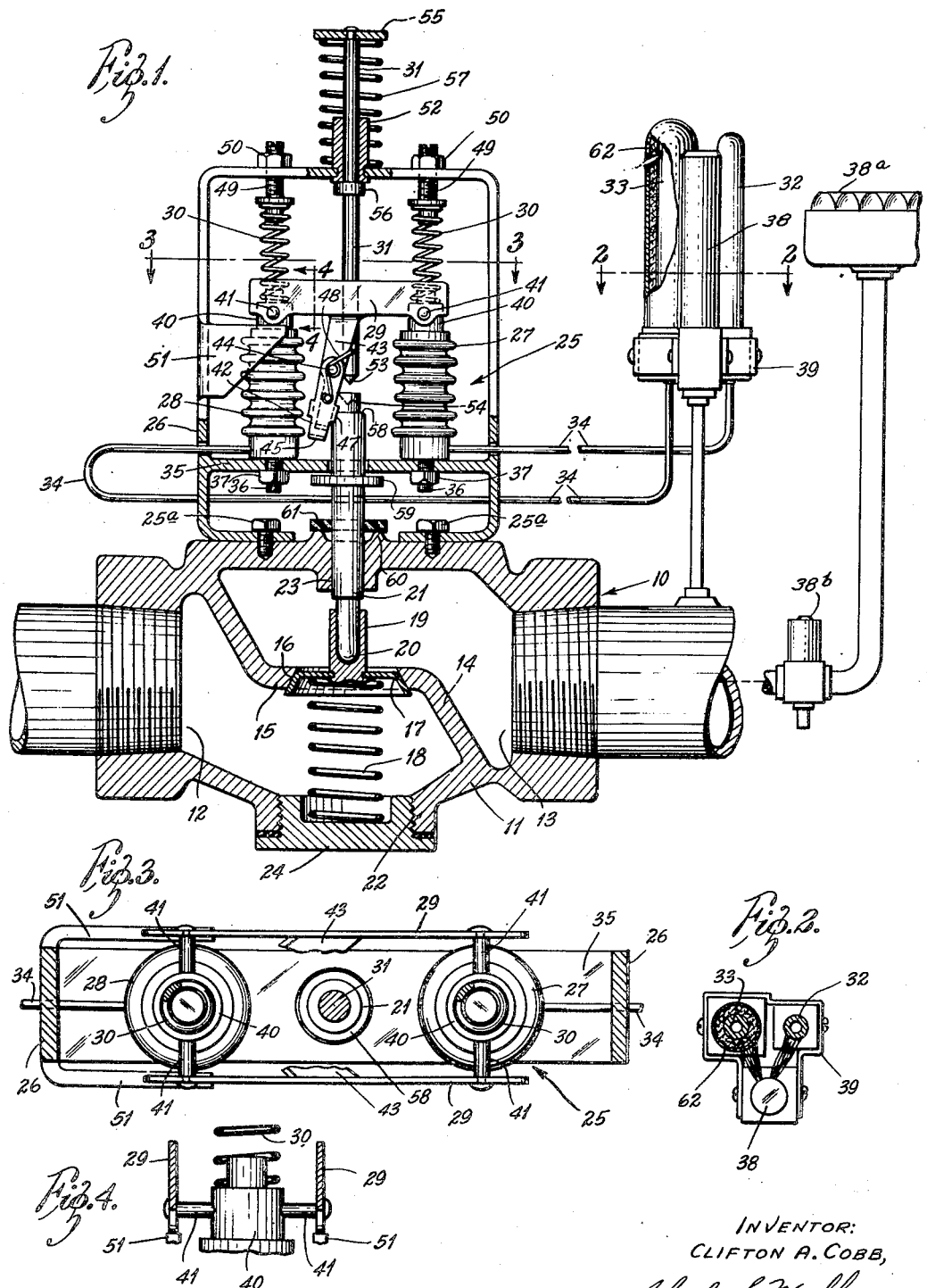
INVENTOR:
CLIFTON A. COBB,
BY Charles E. Markham
AGENT.

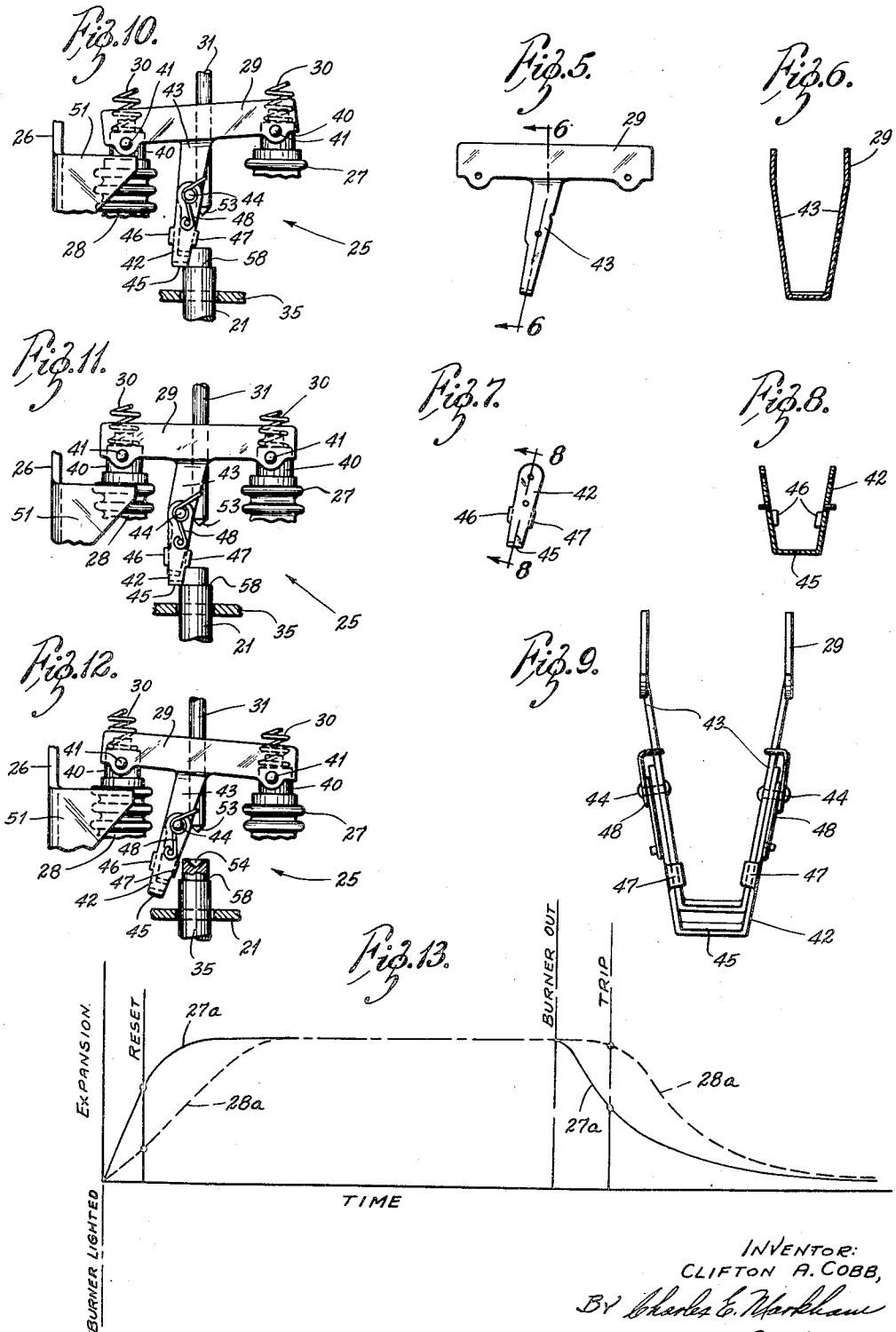

Oct. 24, 1950 C. A. COBB 2,527,117
TEMPERATURE RESPONSIVE CONTROL
Filed Sept. 9, 1947 3 Sheets-Sheet 3
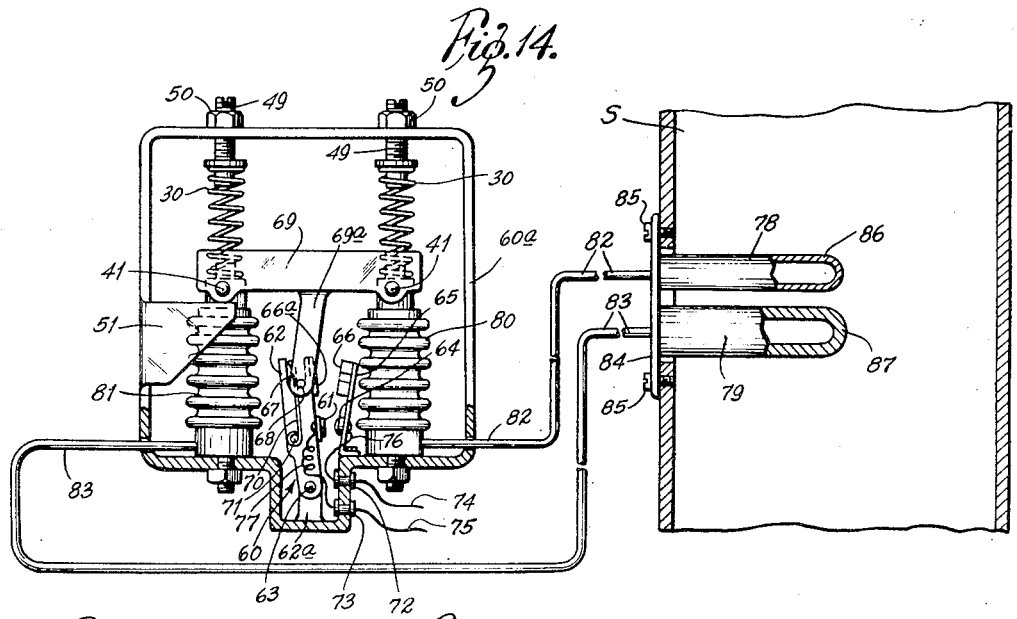
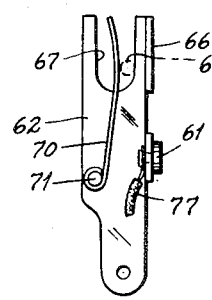
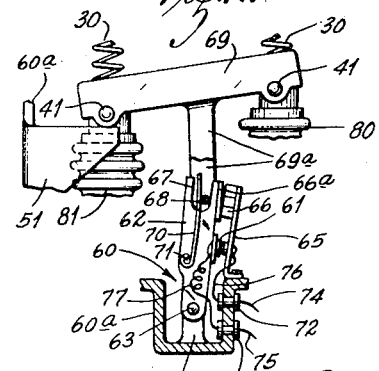
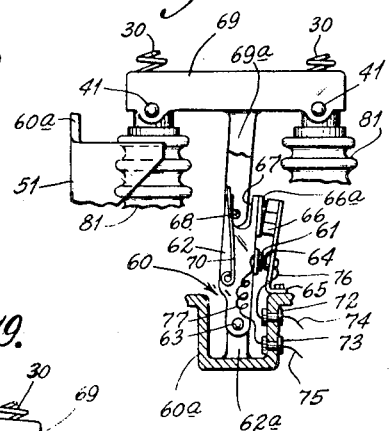
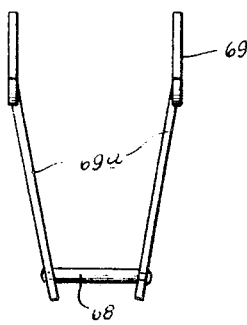
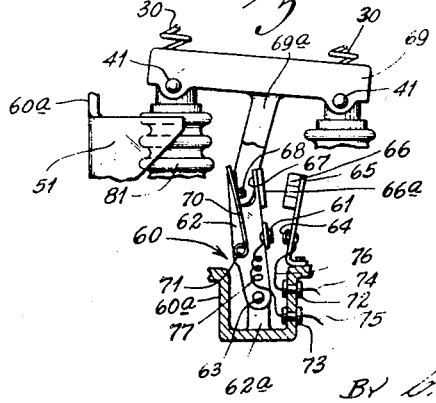
INVENTOR:
CLIFTON A. COBB,
AGENT.

Patented Oct. 24, 1950

2,527,117

UNITED STATES PATENT OFFICE 2,527,117

TEMPERATURE RESPONSIVE CONTROL

Clifton A. Cobb, University City, Mo., assignor to Missouri Automatic Control Corporation, St. Louis, Mo., a corporation of Missouri Application September 9, 1947, Serial No. 773,053

9 Claims. (Cl. 158—117.1)

This invention relates generally to temperature responsive control devices, and more particularly to control devices which are capable of responding quickly to a temperature change of predetermined rate and degree at any point throughout a considerable range of temperature variation.

Devices of this character are generally referred to as being rate of change responsive. They usually comprise a pair of temperature sensitive elements constructed and arranged so that one of the elements responds more rapidly than the other, upon a change in temperature, to move a control member quickly by its initial responding movement to one control position or the other depending on the direction of temperature change. The other element being more slowly acting, functions thereafter to compensate to a degree any continued movement of the fast acting element in the same direction as the temperature continues to change in the same direction, so that upon a temperature change in the opposite direction the control can again be quickly moved to the opposite control position by the initial oppositely responding movement of the fast acting element. In these arrangements it has been necessary heretofore to continuously maintain a certain minimum differential in the temperature of the elements, as the temperature continued to change in the same direction throughout the range, so as not to cancel out the movement imparted to the control member by the initial response of the fast acting element.

It has been found difficult and sometimes impossible to arrange the elements with respect to the heat source so as to maintain this minimum differential in certain uses of the device. For example; when used in a furnace to detect flame at a pilot burner which ignites an adjacent main burner, the temperature ambient to the pilot burner due to the proximity of the main burner may become high enough in some installations and at the same time the fuel supply pressure to the pilot burner may for a period drop low enough to cause the elements to approach the same temperature, to the extent that the minimum positional differential of the elements is lost, causing the device to misfunction. Again in detecting flame at the main burner in oil burner control systems, it has been found undesirable to subject the elements heretofore used in devices of this character to direct burner flame, due to rapid deterioration and therefore, the elements have usually been installed either in the fire box near the flame or in the stack at some distance above the flame. In these installations it will be seen that it would be difficult to arrange the elements to prevent their ultimately attaining the same temperature.

To obviate the necessity of maintaining a temperature differential of the elements in order to maintain a minimum positional differential, elements having different coefficients of expansion, different lengths or capacities have been proposed. That is, the slow acting compensating element has been constructed of material having a lower coefficient of expansion or of less length or capacity than the fast acting element, thereby insuring that the slow acting element will not catch up to cancel out the minimum positional differential required to maintain the control position. While this proposal overcomes the possibility of losing the minimum required positional differential, it will be apparent that the positional differential will increase as the temperature increases due to the increasing difference in total expansion of the elements, thereby slowing down the action of the control. With these arrangements the optimum positional differential could therefore be obtained only at one point in the temperature range.

The present invention overcomes these difficulties by obviating the necessity of continuously maintaining a minimum temperature differential in the elements or of employing temperature responsive elements of different expansion coefficients, lengths or capacities, in a manner to be fully described hereinafter.

It is an object of the present invention to provide a generally new and improved temperature responsive control, having a fast and a slow acting element arranged to respond ultimately a substantially equal amount to a change in temperature, and in which an actuating member is moved first in one direction by the fast acting element and then a substantially equal amount in an opposite direction by the slow acting element in response to a temperature change, and in which a control member having a spring pressed lost motion connection with the actuating member is moved to one position by said fast acting element wherein it is releasably held against the lost motion spring as the slow acting element compensates the movement of the fast acting element and shifts the connection to the opposite limit of the lost motion, whereafter, upon a temperature change in the opposite direction, the control is quickly moved oppositely to a second position by the fast acting element.

It is a further object to provide a device of this character in which the control member is spring pressed to one position and manually moved to a second position against the spring wherein it is releasably held by a detent having a spring pressed lost motion connection with the actuating member, and in which the control spring pressure retains the detent in its control holding position as the slow acting element compensates to move the lost motion connection to its opposite limit.

Other objects and advantages will appear upon perusal of the following description and reference to the accompanying drawings.

Referring to the drawings in which like numerals in the several views refer to like parts;

Fig. 1 is a somewhat diagrammatic illustration of a first form of the present invention. In this use of the invention a manually set control member or valve is held in a set position or released therefrom depending upon whether or not there is flame at a pilot burner;

Fig. 2 is a view taken on line 2—2 of Fig. 1 and shows the relationship of a pilot burner to the temperature sensitive fluid filled bulbs;

Fig. 3 is a view taken on line 3—3 of Fig. 1;

Fig. 4 is an enlarged detail view taken on line 4—4 of Fig. 1;

Fig. 5 is a detail view of the actuating lever;

Fig. 6 is a sectional view of the actuating lever taken on line 6—6 of Fig. 5;

Fig. 7 is a detail view of the pivoted detent;

Fig. 8 is a cross-sectional view of the pivoted detent taken on line 8—8 of Fig. 7;

Fig. 9 is an enlarged right end view of the assembly of the actuating lever, the pivoted detent and the lost motion return spring;

Figs. 10, 11 and 12 are different operative views of the device shown in Fig. 1 in which the relative positions of the actuating lever, detent and valve stem are shown;

Fig. 13 is a diagram illustrating the expansion and contraction rates of the expansible elements following ignition and extinction of flame at the burner.

Fig. 14 is a somewhat diagrammatic illustration of a second form of the present invention. In this use of the invention a control member or switch is moved between open and closed circuit positions upon a condition change at a burner as reflected by temperature changes in a stack.

Fig. 15 is a detail of the switch arm shown apart.

Fig. 16 is an end view of the actuating lever shown apart.

Figs. 17, 18 and 19 are different operative views of the device shown in Fig. 14 in which the relative positions of the actuating lever, and switch arm are shown.

Referring to the drawings, and particularly to Figs. 1 to 12 in which a first form of the present invention is shown, a spring pressed cut-off valve is generally indicated at 10, comprising a valve body 11 having an inlet 12, an outlet 13, and a separating wall 14 which has a horizontal portion 15. There is a seat 16 formed in the horizontal portion which is engaged by a valve member 17 to provide a gas tight closure. The valve member 17 is arranged to open against the direction of flow and is normally biased toward a closed position by a spring 18. The valve is provided with a cylindrical socket member 19 projecting from its posterior or outlet side, which is adapted to receive in free fit relationship the rounded end 20 of a valve stem 21.

There is a lower vertical threaded bore 22, and an upper vertical smooth bore 23 in the valve body 11, both concentric with the valve seat 16. The lower bore 22 provides access for assembly of the valve and is fitted with a threaded closure plug 24. Plug 24 also retains the valve return spring 18. The upper smooth bore 23 receives the valve stem 21 in sliding fit relationship thus providing a guide therefor.

Attached to the upper part of the valve body 11 by attaching screws 25a is a trip and reset valve actuating mechanism generally indicated at 25, by which the valve 16 can be moved to an open position and held open against spring 18 under certain conditions, and released to close under the action of the spring under certain other conditions. This mechanism is assembled and supported in a frame member 26 and comprises a pair of expansible elements 27 and 28, a U-shaped actuating lever 29, element return springs 30, a valve setting plunger 31, and a pair of bulbs 32 and 33 which are connected to the expansible elements 27 and 28 respectively by capillary tubes 34.

The expansible elements 27 and 28 are of corrugated thin tube construction and extend longitudinally upon increased internal pressure in a well known manner. The elements are supported in a vertical position on the horizontal frame member 35 and are rigidly attached thereto at their lower ends by the studs 36 and nuts 37. Each of the expansible elements and its respective bulb and capillary connector comprise an independent hermetically sealed unit and each unit is filled with a temperature sensitive fluid. It is desirable to employ a fluid which will remain stable at high temperatures, in the order of 800° to 1000° F. Presently I prefer to use argon gas.

The fluid filled elements or bulbs 32 and 33 are supported adjacent a pilot burner indicated at 38, the fuel supply to which is controlled by the valve 10. The support means may be any suitable device such as the bracket shown at 39, see Fig. 2. It is essential, however, to the satisfactory operation of the device that the elements 32 and 33 are arranged with respect to the pilot burner flame such wise that they will both ultimately attain approximately the same temperature. This may be accomplished in various ways. Presently the elements are supported approximately equidistant from substantially uniform burner ports so that they receive approximately the same amount of heat. One of the elements, in this case element 33, is insulated with a heat insulating covering 62, as indicated, so as to slow down its heating and cooling rate. A main burner is indicated fragmentally at 38a, the fuel supply to which is also under control of the cut-off valve 10. A conventional electrically operated valve 38b located between the pilot fuel take off and the main burner, operates to control the supply of fuel to the main burner in accordance with requirements for heat.

The upper ends of the expansible elements 27 and 28 are provided with cylindrical plugs 40 which are fitted with transverse pivot pins 41. The actuating lever 29 is pivoted near the ends of its horizontal portions on the pivots 41. There is a detent 42 pivotally connected to the vertical portions 43 of the actuating lever on pivots 44. Detent 42 is generally U-shaped having a lower horizontal portion 45, see Fig. 8, and is provided on opposite sides of its vertical parallel legs with angularly formed ears or stops 46 and 47, which abut the edges of the vertical portions 43 of the actuating lever 29. The stops 46 and 47 are spaced so as to permit limited rotation or lost motion of the detent with relation to the vertical portions 43 of the actuating lever. Springs 48 biased between the detent and the portions 43 of the actuating lever urge the detent in a clockwise direction with respect to the actuating lever 29 so that stops 47 are normally resting against the right hand sides of the actuating lever portions 43. It will be seen therefore, that a definite spring pressed rotational lost motion between the actuating lever 29 and detent 42 is provided.

Expansible elements 27 and 28 are returned from extended positions upon cooling and contraction of the temperature sensitive fluid by the relatively strong element return springs 30. The tension of these springs is made independently adjustable by the provision of the studs 49, threadedly mounted in the top horizontal member of frame 26, and which can be locked in an adjusted position by the lock nuts 50. Stop members 51 formed as a part of the left-hand vertical member of frame 26 limit the downward travel of the left end of actuating lever 29 for a reason to be explained hereinafter.

The valve setting plunger 31 is coaxial with the valve stem 21 and is guided in a bushing 52 in the top horizontal member of the frame 26 and is provided for the manual movement of valve 16 to an open position. The lower end of the plunger 31 is provided with a conical point 53 which registers with a conical depression 54 in the upper end of the valve stem. The plunger is further provided with a head member 55 riveted thereto, an upper travel limit stop collar 56, and a return spring 57 by which it is retained in its upper position.

Valve stem 21 has a reduced portion at its upper end and a square shoulder is formed at the point of this reduction as indicated at 58. The valve stem is also provided with a collar 59 rigid therewith, and which together with the seat 60 formed at the upper end of the bore 23 and the pliable washer 61 form a gas tight seal at the upper end of the bore when the valve is depressed to its fully open and set position.

*Operation of the first form*

In Fig. 1 of the drawing, the device is shown in a cold position, that is to say; the position which the device will assume after a sufficient period without burner flame to permit the burner compartment, the bulbs 32 and 33 and therefore the temperature sensitive fluid therein to approach surrounding temperatures. The horizontal portions of the actuating lever 29 are substantially level under these conditions with the left end bearing on the stops 51 and the vertical portion of the lever 43 with the detent 42 thereon moved sufficiently toward the left of the valve shaft 21 to permit the shoulder 58 to clear the lower horizontal portion 45 of the detent and permit the valve to close.

Under these conditions if it is desired to light the burner 38, the pilot plunger 31 is depressed until the collar 59 thereon contacts the pliable washer 61 partly compressing it and sealing the upper end of bore 23. This movement will open the fuel valve and position the shoulder 58 on the valve stem slightly below the lower end of the detent 42. The plunger is manually held in this position while the pilot burner 38 is lighted. During the period immediately following ignition of the burner, bulb 32 will heat much more rapidly than bulb 33, due to the insulating jacket 62, and as a result expansible element 27 will expand much more rapidly than expansible element 28.

In Fig. 13 solid line 27a and dotted line 28a illustrate graphically the differential in expansion and contraction rates of the expansible elements 27 and 28 respectively immediately following ignition and extinguishment of the pilot burner due to the slower heating and cooling rate of insulated bulb 33 which is connected to element 28. This differential in expansion rate immediately following ignition, in which expansible element 27 expands more rapidly than element 28, causes the actuating lever 29 to be rotated in a counter-clockwise direction about the left hand pivot 41 toward the position indicated in Fig. 10. When this differential reaches a predetermined point as indicated by the vertical line marked "reset" in Fig. 13, the detent 42 will have been moved toward the right to a position in which shoulder 58 on the valve shaft will abut the lower horizontal leg 45 of the detent and the valve 16 will thereby be latched in an open or set position as indicated in Fig. 10. The manual reset plunger may now be released.

As the bulbs 32 and 33 continue to heat, this differential in expansion rates will diminish, as indicated by the convergence of the full and dotted lines, to substantially zero at some stabilized temperature as indicated by the single dot and dash line in Fig. 13. It will also be seen that as this expansion differential diminishes, or as the expansion of element 28 catches up, the actuating lever 29 will be rotated in an opposite or clockwise direction about the right hand pivot 41, and will ultimately assume a position substantially as shown in Fig. 11, in which the elements are extended substantially equally and the lever 29 is substantially in the same angular position as in Fig. 1. As the actuating lever moves clockwise during this phase of operation, the detent 42 is retained in position on shoulder 58 by substantial friction between the shoulder and the detent due to the continuing upward pressure of valve closing spring 18, and relative rotation or lost motion between the actuating lever and the detent about the pivots 44 occurs to permit this. The resistance to this relative rotation by the spring 48 is slight, because the strength of spring 48 needs only to be sufficient to return the detent to a position wherein its stop 47 again abuts the right side of the actuating lever when free of the shoulder 58.

As the actuating lever 29 reaches its stabilized burner on position substantially as shown in Fig. 11, the leg portions 43 of the actuating lever will have been rotated with relation to the detent 42, to the extent that the left sides of the leg portions 43 have closely approached the stops 46 on the detent, and in this position any further counter-clockwise rotation of the actuating lever would immediately begin to move the detent from shoulder 58 and trip the mechanism. The mechanism will, however, remain set indefinitely under conditions of substantially uniform temperature of the bulbs and will not be tripped by gradual changes in temperature which result from normal changes in fuel supply pressure.

The temperature of both elements may continue to rise slowly for some time after the slow acting element has fully compensated the initial movement of the fast acting element, but this rise will be gradual and the expansion of the elements, in response thereto, will therefore be substantially simultaneous and the lever 29 will remain substantially level. It will be seen that the arrangement is such that the lever 29 can move linearly as well as rotationally, and that the valve can be opened sufficiently in the cold position to permit any anticipated linear movement likely to be encountered without restricting the flow.

If for any reason the burner flame is extinguished, the bulbs 32 and 33 will begin to cool immediately. Bulb 32, however, cools much more rapidly immediately following the loss of flame than bulb 33 and therefore, element 27 contracts more rapidly than element 28 as is indicated at the right hand side of the diagram in Fig. 13. This is due to the insulating jacket 62. When this occurs, actuating lever 29 will be further rotated in a clockwise direction about the left hand pivot 41. As this differential in cooling rate and consequently the differential in contraction rate of elements 27 and 28 reaches this point at which the clockwise rotation of the actuating lever 29 through its contact with detent stops 46 has moved the detent free of shoulder 58, the mechanism will be tripped and will assume approximately the position shown in Fig. 12. It will be noted that, as the detent 42 is moved off of shoulder 58 by this clockwise rotation of the actuating lever, it is immediately returned by action of spring 48 to the position in which the stops 47 again bear against the right side of lever portions 43. As both elements continue to cool the mechanism will again assume the position as shown in Fig. 1.

The stops 51 provide a safety feature by limiting the downward travel of the left end of the actuating lever 29, which insures the tripping of the mechanism in event of loss of fluid pressure in element 28 or bulb 33 through leakage or for any reason. A loss of fluid pressure in element 27 or bulb 32 will obviously immediately cause the tripping of the mechanism.

A second form of the present invention is shown in Figs. 14 to 17. In this form the temperature responsive mechanism actuates a switch generally indicated at 60 in response to a predetermined temperature change and rate of change in a furnace stack indicated in part at S, which reflects the change from flame to no flame and vice versa at the main burner. The device may be arranged to maintain a holding circuit for the energization of electrically operated fuel supply means for the burner, wherein it responds to quickly close a holding circuit upon successful ignition of the burner and to hold it closed thereafter until such time as the burner flame is extinguished and then to break the circuit quickly.

The switch 60 mounted in a frame 60a comprises a movable contact 61 mounted on a switch arm 62, which is pivoted at one end on a bracket 62a at 63, and a stationary contact 64 mounted on a bracket 65. Also mounted on the bracket 65 is a permanent magnet 66. The arm 62 is provided with a right angularly formed portion 66a of magnetic material which is attracted by the magnet as the arm is moved toward it under certain conditions. It will be understood that the lever 60 may be made of non-conducting material and that the armature 67 may be attached thereto by any suitable means. If the arm is constructed of magnetic material and the armature formed as a part thereof as indicated, the contact 61 will, of course, be suitably insulated therefrom.

The upper free end of the arm is provided with a slot 67 which receives a pin 68 mounted in the lower end of the vertical leg 69a of actuating level 69. The slot 67 is considerably wider than the diameter of pin 68 in order to provide a definite lost motion connection between the lever 69 and the arm 62. A leaf spring 70 mounted on the arm 62 at 71 is provided and normally urges the pin 68 to the right side of the slot 67, as shown in Fig. 14, so that upon counter-clockwise rotation of lever 69 the movement is transmitted positively to the arm 62 to move it in a clockwise direction. There is a pair of terminals 72 and 73 mounted in the frame 60a and suitably insulated therefrom and a pair of leads 74 and 75 for connection in a circuit for either directly energizing a fuel supply means or for controlling and energizing circuit therefor through a relay. There is also a connector 76 between terminal 72 and contact 64 and a pig-tail connector 77 between terminal 73 and contact 61.

Mounted in the stack 61 are a pair of bulbs 78 and 79 which are connected to expansible elements 80 and 81 by capillary tubes 82 and 83. The bulbs are fixed to a cover plate 84 which is attached to the wall of the stock by screws 85. The separate systems comprising the bulb, the expansible element, and the capillary are each filled with a temperature sensitive fluid. The bulb 78 has a thin wall as indicated at 86 while the bulb 79 has a much thicker wall as indicated at 87. Other structure employed in this form of the invention is similar to that shown in Fig. 1 and therefore like numerals are used.

*Operation of the second form*

In Fig. 14 the device is shown in a cold position. Under these conditions when the burner is ignited the stack temperature rises rapidly and bulb 78 being of thin wall construction transmits the heat quickly to the temperature sensitive fluid therein. As a result the expansible element 80 extends and rotates lever 69 in a counter-clockwise direction about the left hand pivot 41, and due to the fact that pin 68 bears against the right side of slot 67, the movement is positively transmitted to the arm 62 rotating it in a clockwise direction to close contacts 61 and 64 and to bring armature 66a in contact with the magnet 66 as indicated in the operative view Fig. 17.

The bulb 79 being of considerably thicker wall construction will delay any substantial heating of the fluid therein until the contacts are closed. Thereafter element 81 will expand an amount substantially equal to the expansion of element 80 and the device will assume a position as indicated in Fig. 18, in which the lever 69 has been rotated oppositely about its right hand pivot 41 due to the catching up of bulb 79 and element 81 to approximately its original angular position, but in which the arm 62 is retained in its closed contact position by the magnet 66 and in which the pin 68 has moved to the left side of the lost motion slot 67 against the relatively light lost motion return spring 70.

As the temperature continues to rise gradually thereafter, the lever 69 will move upwardly, but in a substantially level position. The slot 67 is made sufficiently long to maintain a contact between the pin 68 and the switch arm for any anticipated linear movement of the lever 69.

If now the burner flame is extinguished for any reason, the stack temperature will drop rapidly and the fluid in bulb 78 will cool and contract more quickly than that in bulb 79 due to the relatively light mass of the bulb. As a result expansible element 80 will contract and the arm 69 will be rotated in a clockwise direction about the left hand pivot 41. Because pin 68 now bears against the left side of the slot 67 there will be a positive connection between lever 69 and the switch arm 62 and the contacts will be quickly opened by the initial responding movement of the fast acting system. The device now assumes the position shown in Fig. 19. It will be understood that the strength of expansible element return springs 30 is substantially greater than the magnetic force which retains the switch arm and easily overcomes this magnetic force. Thereafter as cooling continues the device will again assume the original position shown in Fig. 14 in which the pin 68 is again pressed against the right side of the slot 67 by the leaf spring 70.

It will be understood that there are many modifications and uses of the present invention, therefore, it is intended that the foregoing description be illustrative and not limiting, and that the exclusive use of all modifications within the scope of the appended claims is contemplated.

I claim:

1. In a temperature responsive control, a lever having a neutral position under stabilized temperature conditions a fast acting temperature responsive device and a slow acting temperature responsive device constructed and arranged to respond a substantially equal amount to a temperature change, having spaced pivoted connections with said lever on the same side thereof whereby said lever is rotated from its neutral position as said devices expand or contract at different rates, a member having a lost motion connection with said lever and being movable thereby between first and second operative positions, means for releasably holding said member in said first operative position and resilient means for biasing said connection to one limit of its lost motion, the arrangement being such that upon a temperature change in one direction of predetermined rate and degree said member is moved thru positive connection with said lever to said first operative position by the action of said fast acting device, is held in this position by said releasable holding means as said slow acting device responds a substantially equal amount to return said lever to its neutral position against said resilient means and to shift said lost motion connection to its opposite limit whereafter upon a temperature change of predetermined rate and degree in an opposite direction said member is moved again through positive connection with said lever to its other operative position by said fast acting device.

2. In a temperature responsive control, a lever having a neutral position under stabilized temperature conditions a fast acting and a slow acting temperature responsive device constructed and arranged to respond a substantially equal amount to a temperature change, said devices having spaced pivoted connections with said lever on the same side thereof whereby said lever is rotated from its neutral position first in one direction in response to a rapid temperature change and then a substantially equal amount in an opposite direction back to its neutral position as the rate of temperature change decreases to a predetermined point, a member having a spring pressed lost motion connection with said lever and being movable thereby between first and second operative positions, and means for releasably holding said member in said first operative position, said lost motion connection being normally spring pressed in such direction that upon an increase in temperature of predetermined rate and degree said member is moved positively to said first operative position by the action of said fast acting device and said lost motion connection being constructed and arranged to permit said member to be held in said first position by said releasable holding means as said slow acting device acts oppositely a substantially equal amount against the lost motion spring to shift said lost motion connection to its opposite limit whereby thereafter upon a decrease in temperature of predetermined rate and degree said member is moved positively in an opposite direction to said second operative position by said fast acting device.

3. In a device of the class described, a control element, a spring for moving said control element to a first position, manual means for moving said control element to a second position against said spring, a member movable in one direction to a latching position for retaining said control element in said second position and movable in an opposite direction to release it, the engagement between said movable member and said control member being such that said movable member is releasably held in such engagement by said control spring, a lever having a spring pressed lost motion connection with said movable member, a fast acting and a slow acting temperature responsive device operatively connected to said lever at spaced points, the arrangement being such that said lever is first rotated a predetermined amount in one direction by said fast acting device in response to a predetermined rapid change in temperature and is then subsequently rotated a substantially equal amount in an opposite direction by said slow acting device as the rate of temperature change decreases to a predetermined point, said spring pressed lost motion connection being normally spring pressed in such direction that said movable member is moved through positive connection to its latching position, and said spring pressed lost motion connection being constructed and arranged so as to be shifted to its opposite limit as said slow acting device compensates the initial movement of said fast acting device.

4. In a fuel cut-off device in combination, a burner, a control element for controlling the supply of fuel to said burner, a spring for normally biasing said control element in a fuel cut-off position, manual means for moving said control element to a fuel-on position, a lever, a fast acting and a slow acting temperature responsive device constructed and arranged to respond a substantially equal amount to a temperature change and having spaced operative connections with said lever on the same side thereof so as to rotate said lever first in one direction and then in an opposite direction upon a rapid change and a subsequent stabilization of temperature, said temperature responsive devices being arranged to be heated substantially equally by said burner, a member movable in one direction to a position for holding said control element in a fuel-on position and movable oppositely to release it, means for releasably holding said member in a control holding position, said movable member having a relatively light spring pressed lost motion connection with said lever, the arrangement being such that upon a change from no-flame to flame at the burner said member is moved through positive connection by said fast acting device a predetermined amount in one direction to said position for holding said control member in a fuel-on position wherein it is retained by said releasable holding means against the relatively light lost motion spring as said slow acting device rotates said lever a substantially equal amount oppositely and shifts the lost motion connection substantially to its opposite limit, whereafter upon a change from flame to no-flame at the burner said member is moved oppositely through positive connection by said fast acting device to a control releasing position.

5. In a temperature responsive control, a fast acting and a slow acting temperature responsive device, said devices being constructed and arranged to respond to substantially equal amount to a temperature change and each having a fixed and a free end, said free ends having basic relative positions under conditions of stabilized temperature, a control member movable oppositely between first and second operative positions, mechanism operatively connected to the free ends of said devices for moving said member to one operative position or the other as the relative positions of said devices change a predetermined amount in one direction or the other from their basic relative positions due to a rapid increase or decrease in temperature, said mechanism including a lost motion connection, and resilient means normally biasing said connection to one limit of its lost motion in such manner that said control member is moved through positive connection to said first operative position as the relative positions of said elements change a predetermined amount in one direction from their basic relative positions due to a rapid change in temperature in one direction, means rendered operative as said control member is moved to said first operative position for releasably holding it there against said resilient means as said devices return to their basic relative positions in response to a subsequent decrease in the rate of temperature change, said lost motion connection being constructed and arranged so as to be shifted substantially to its opposite limit as said devices return to their basic relative positions, whereby said control member will be moved through positive connection toward said second position as the relative positions of said elements change in an opposite direction due to a rapid change in temperature in the opposite direction.

6. In a temperature responsive control, a fast acting and a slow acting temperature responsive device constructed and arranged to respond a substantially equal amount in the same direction in response to a temperature change, said devices each having a fixed and a free end which free ends have basic relative positions under conditions of stabilized temperature, a lever having operative connections with said devices at spaced points thereon and on the same side thereof whereby said lever is rocked about one or the other of its connections with said devices as they expand and contract differentially, a control member having a lost motion connection with said lever, resilient means normally biasing said lost motion connection to one limit of its lost motion such wise that said control member is moved through positive connection with said devices in one direction to a control position as the relative positions of said devices change a predetermined amount in one direction from their basic relative positions in response to a rapid change in temperature in one direction, means for releasably holding said control member in said control position, said releasable holding means being sufficient to retain said member in said control position against said resilient means as said devices return to their basic relative positions in response to a decrease in rate of temperature change, and said lost motion connection being constructed and arranged so as to be shifted substantially to the opposite limit of its lost motion as said devices return to their basic relative positions, whereby said control member will thereafter be moved by positive connection with said devices away from said control position as the relative positions of said devices change in an opposite direction from their basic relative positions in response to a rapid change in temperature in the opposite direction.

7. In a temperature responsive control, a fast acting and a slow acting temperature responsive device constructed and arranged to respond a substantially equal amount in response to a temperature change, said devices each having a fixed and a free end which free ends have basic relative positions under conditions of stabilized temperature, an actuating member operatively connected with said devices in such manner that operational movement is imparted thereto directionally and proportionately with changes in the relative positions of the free ends of said devices with respect to their basic relative positions, a control member, a pair of spaced and opposed abutments on one of said members, a contact element arranged to alternately engage said abutments on the other of said members, resilient means for normally holding said element in engagement with one of said abutments such wise that said control member is moved through positive connection in one direction to a control position as the relative positions of said devices change a predetermined amount in one direction from their basic relative positions in response to a rapid temperature change in one direction, means rendered operative as said member is moved to said control position for releasably holding it there, said abutments being so spaced that said element is moved against said resilient means substantially into engagement with the other of said abutments as said elements return to their basic relative positions in response to a decreasing rate of temperature change while said control member is so held, whereby said control element will be moved oppositely through positive connection in response to a predetermined rate of temperature change in the opposite direction.

8. In a temperature responsive control, a pair of temperature responsive devices arranged side by side and being constructed and arranged to respond a substantially equal amount to a temperature change, said devices having basic relative operative positions under conditions of stabilized temperature, means for retarding the effect of temperature change on one of said devices to obtain predetermined changes in the relative positions of said devices in response to rapid temperature changes, an actuating member pivotally connected to said devices at spaced points thereon and on the same side thereof whereby said member is rotated about one or the other of its connections with said devices as they expand or contract differentially, and whereby said member is moved linearly by joint expansion or contraction of said devices, a control member, a pair of spaced and opposed abutment surfaces on one of said members, a contacting element arranged to alternately engage said abutment surfaces on the other of said members, said abutment surfaces being extended substantially in the direction of action of said devices whereby said contacting member will continue to engage said surfaces as said actuating member is moved linearly, resilient means for normally holding said contacting element in engagement with one of said abutment surfaces such wise that said control member is moved through positive connection in one direction to a control position in response to a predetermined rate of temperature change in one direction, means rendered operative as said control member is moved to said control position for releasably holding it there, said abutment surfaces being so spaced that said contacting element is moved substantially into engagement with said opposite abutment surface as said elements return to their basic relative positions in response to a decreasing rate of temperature change while said control member is so held, whereby said control member will be moved oppositely from said control position through positive connection in response to a predetermined rate of temperature change in the opposite direction.

9. In a temperature responsive control, a fast acting and a slow acting temperature responsive device arranged side by side, said devices being constructed and arranged to respond a substantially equal amount to a temperature change and each having a fixed and free end which free ends have basic relative positions under conditions of stabilized temperature, a lever operatively connected to said devices at spaced points thereon and on the same side thereof, whereby said lever is rocked about one or the other of its connections with said devices as they expand or contract differentially and whereby said lever is moved linearly by joint response of said devices, a control member having a lost motion connection with said lever, resilient means normally biasing said lost motion connection to one limit of its lost motion such wise that said control member is moved through positive connection with said devices to a control position as the relative positions of said devices change a predetermined amount in one direction from their basic relative positions in response to a rapid change in temperature in one direction, means for releasably holding said control member in said control position, said releasable holding means being movable in the direction of action of said devices and being sufficient to retain said member in said control position against said resilient means as said devices return to their basic relative positions in response to a decrease in rate of temperature change, and said lost motion connection being constructed and arranged so as to be shifted substantially to the opposite limit of its lost motion as said devices return to their basic relative positions, whereby said control member will thereafter be moved by positive connection with said devices away from said control position as the relative positions of said devices change in an opposite direction from their basic relative positions in response to a rapid change in temperature in the opposite direction.

CLIFTON A. COBB.

REFERENCES CITED

The following references are of record in the file of this patent:

UNITED STATES PATENTS

| Number | Name | Date |
| --- | --- | --- |
| 1,773,817 | Leach | Aug. 26, 1930 |
| 1,994,983 | DeFlorez et al. | Mar. 19, 1935 |
| 2,171,815 | Thomas | Sept. 5, 1939 |
| 2,379,124 | Wasson | June 26, 1945 |